INVENTOR
H. A. CLAY
BY
Young & Quigg
ATTORNEYS

United States Patent Office

3,403,080
PROCESS FOR RECOVERING OLEFIN MONOMER FROM CATALYST WASHING RESIDUES CONTAINING SOLUBLE POLYMER OF THE OLEFIN
Harris A. Clay, Bartlesville, Okla., assignor to Phillips Petroleum Company, a corporation of Delaware
Filed Mar. 24, 1965, Ser. No. 442,418
9 Claims. (Cl. 203—98)

ABSTRACT OF THE DISCLOSURE

Solvent such as monomer used in washing solid olefin polymer to remove soluble polymer is recovered from the wash solution containing the soluble polymer by distillation in a distillation column to recover solvent overhead and solution rich in the soluble polymer as bottoms, the bottoms being passed to a phase separation zone at a temperature at least 10° F. above the upper cloud point of the solution to recover an upper phase of low polymer concentration and a lower phase of high polymer concentration, the upper phase of low polymer concentration is passed to the column reboiler containing heat exchange tubes to prepare reboil liquid, thereby reducing or eliminating fouling of the tubes by polymer deposition which occurs with use of total bottoms as reboil liquid. The phase separation at a temperature above the upper cloud point is novel and unexpected.

---

Figures 1, 2:
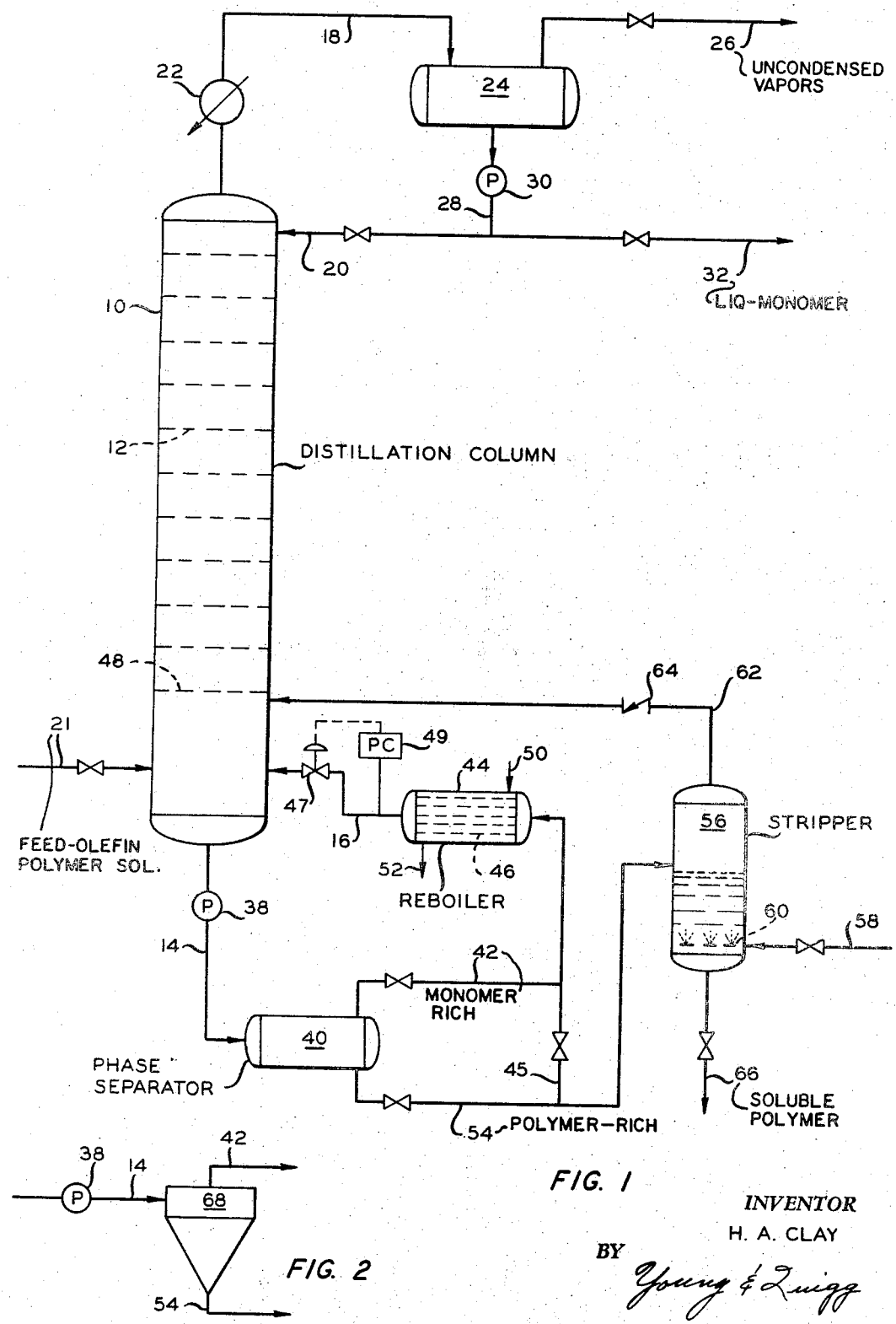

This invention relates to a process and apparatus for preventing polymer deposition in a reboiler functioning in association with a fractionation or distillation column engaged in recovery of solvent olefin from a solution of polymer in the solvent.

This invention is an improvement in the operation of the process and apparatus of the copending application of J. J. Moon entitled "Preparation of Soluble Polymer and Catalyst Residues for Disposal," Ser. No. 228, 711, filed Oct. 5, 1962, now U.S. Patent 3,257,372.

In the operation disclosed in the aforesaid copending application, olefin is being recovered from a washings stream from a polymerization process wherein both solid and soluble polymer are present. The washing agent is the same monomer as used in the polymerization step. This stream of monomer and soluble polymer is fed into a conventional distillation column utilizing an indirect heat exchanger as a reboiler thru which a portion of the effluent bottoms stream from the fractionator, containing soluble polymer in higher concentration than in the feed stream to the column, is passed thru the tubes of the reboiler and there heated by indirect heat exchange with a heating fluid to provide the reboiled fluid to operate the column. Due to the concentration of polymer in the reboiled liquid and the low flow rate thru the reboiler tubes, considerable difficulty has been experienced in maintaining the reboiler in service. This reboiler has become fouled by polymer deposition in the heat exchange tubes in periods of operation in the range of about 8 hours to 8 weeks. Such fouling requires cleaning out of the tubes with loss of service of the reboiler during the cleaning period. When preparing a copolymer of propylene and ethylene in which the propylene is the major component, the reboiler was fouled in the period of about 8 hours, while fouling required from one to eight weeks when producing homopolymers of propylene.

This invention is concerned with a process and apparatus for decreasing or completely avoiding polymer deposition in the reboiler tubes in service in such a process as that described in the preceding paragraph.

Accordingly, it is an object of the invention to provide a process and apparatus for decreasing or preventing polymer deposition in the heat exchange tubes of a reboiler in service in association with a distillation column effecting recovery of light hydrocarbon solvent or wash liquid containing soluble polymer. Another object is to provide a process and apparatus for decreasing the soluble polymer concentration in a reboil stream being passed to a distillation column effecting recovery of light hydrocarbon solvent from soluble polymer therein. A further object is to provide a process and apparatus for recovery of olefin monomer from the wash liquid in an olefin polymerization process wherein the solid polymer made in the process is washed with monomer to remove soluble polymer from the insoluble, solid polymer product, which results in recovery of a larger proportion of the monomer from the wash liquid and more efficient operation. Other objects of the invention will become apparent to one skilled in the art upon consideration of the accompanying disclosure.

A broad aspect of the invention comprises fractionally distilling a wash liquid comprising principally olefin monomer and soluble polymer along with minor amounts of other materials such as catalyst residue, metal chelates, and acetylacetone, to recover substantially pure monomer overhead, a bottoms effluent substantially richer in soluble polymer than the feed to the process, effecting a phase separation of the bottoms effluent at a temperature substantially above the upper cloud point of the bottom effluent to recover a lighter fraction richer in olefin monomer and leaner in soluble polymer than their concentrations in said feed to the process and a heavier fraction substantially richer in soluble polymer and leaner in olefin monomer than said feed, passing the lighter fraction thru a reboiler as reboil liquid, and passing the reboil liquid back to the column.

It has been found that a solution of soluble polyolefin in an olefin monomer forms two distinct phases when allowed to settle or when centrifuged at temperatures above the upper cloud point of the solution. Thus, when propylene containing a substantial concentration of polypropylene which is soluble in the propylene is heated to a temperature above approximately 120 to 125° F., the solution separates into two phases, the heavier fraction containing a substantially greater concentration of the soluble polymer and a substantially lesser concentration of the propylene than the lighter fraction which concomitantly contains a substantially lower concentration of the soluble polymer and a substantially higher concentration of the propylene. This phase separation of an olefin-soluble polymer solution makes it feasible and effective to subject the bottoms fraction from the distillation column in use in distilling off the olefin monomer from the soluble polymer, to phase separation so as to concentrate the soluble polymer in the heavier fraction and the propylene or other olefin in the lighter fraction, the lighter fraction then being passed thru the reboiler tubes to be heated as reboil liquid for introduction into the bottom of the column. This technique of operation substantially eliminates polymer deposition on the inside of the reboiler heat exchange tubes.

A more complete understanding of the invention may be had by reference to the accompanying schematic drawing of which FIGURE 1 is a flow scheme illustrating a preferred arrangement of apparatus in accordance with the invention and FIGURE 2 is a view of an alternative phase separator for use in the arrangement of FIGURE 1.

Referring to the drawing and to FIGURE 1 in particular, a fractional distillation column 10 is provided with a number of trays 12, a bottoms effluent line 14, a reboil liquid feed line 16, an overhead vapor line 18, a reflux inlet line 20, and a feed line 21. Overhead vapor line 18 is provided with a condenser 22 and leads into an accumulator 24. Accumulator line 26 connects with the vapor space of accumulator 24 for withdrawal of light uncondensed vapors. Line 28 containing pump 30 connects with the bottom of accumulator 24 for withdrawal of liquid monomer and passage of same under the impetus of the pump either thru line 20 into the column as reflux or thru olefin recovery line 32.

Line 14 containing circulating pump 38 leads into a phase separator 40 which may be a settling vessel or a centrifugal separator (liquid cyclone). The upper section of separator 40 is connected by line 42 with the inlet end of heat exchanger or reboiler 44 containing indirect heat exchange tubes 46. The outlet end of the heat exchange tubes communicate with reboil liquid line 16 leading into the bottom of column 10 below bottom tray 48. Reboiler 44 is supplied with hot heat exchange fluid from line 50 and the cooled fluid is discharged thru line 52. Line 45 connects line 42 with line 54 to provide passing light phase from separator 40 to stripper 56 so as to periodically decrease certain reject materials, such as propylene oxide, acetyl acetone, etc. which tend to build up in the light phase.

Line 54 connects the lower section of phase separator 40 with stripper 56 for conveying the heavier fraction from the phase separator containing most of the soluble polymer into the stripper. Stripping gas feed line 58 communicates with distributing nozzles 60 within the stripper 56 so as to disperse stripping gas upwardly thru the body of liquid in the stripper. Overhead vapor line 62 containing check valve 64 connects the top of the stripper with reboil liquid feed line 16 but it may also connect directly with the reboil section of column 10. Effluent line 66 connects with the bottom of stripper 56 for withdrawal of a stream of concentrated soluble polymer.

Referring to FIGURE 2 a centrifugal separator or liquid cyclone 68 may be substituted for phase separator 40 in the arrangement of FIGURE 1. This cyclone has its feed inlet connected with line 14, its overhead outlet for the lighter fraction connected with line 42, and its lower outlet for the heavier fraction connected with line 54.

Distillation column 10 is operated in conventional manner except for the novel treatment of the bottoms stream provided by the instant invention. The bottoms effluent in line 14 is subjected to phase separation in vessel 40 either by settling or centrifugation so as to separate the bottoms liquid into a lighter fraction rich in monomer and lean in soluble polymer and a heavier fraction rich in soluble polymer and lean in monomer, the lighter fraction being passed thru line 42 to reboiler 44 where it is heated to a temperature suitable for effecting the desired degree of vaporization of the reboiled liquid as it passes into the bottom of the distillation column. Motor valve 47 in line 16 is controlled by pressure controller 49 to maintain a desired pressure on the fluid in heat exchanger 44 to suppress vaporization therein. This lighter fraction containing a substantially reduced concentration of soluble polymer substantially eliminates the deposition of polymer in the heat exchange tubes and the higher concentration of the monomer in this reboil liquid stream and the lower concentration thereof in the stream in line 54 increases the recovery of monomer from the feed passed to the column thru line 21. In other words, with the method and apparatus of the invention, the concentration of monomer in the stream in line 66 may be reduced substantially over that found in this stream in normal operation of the distillation column and stripper without the phase separation of the invention.

The stripping in vessel 56 is effected in conventional manner by introducing hot monomer into the liquid in this vessel thru line 58 and nozzles 60. The control of the withdrawal of concentrated soluble polymer thru line 66 can be effected by suitable liquid level controller (not shown) on stripper 56 which is connected with the motor valve in line 66. The recovered monomer in line 62, passed into the reboiler section of column 10, facilitates the distillation or fractionation operation in the column.

The invention is applicable to the separation of volatile hydrocarbons broadly from solutions of soluble polymer therein and is particularly adapted to the separation and recovery of mono-olefins of 2–8 carbon atoms from solutions of their soluble polymers therein. Propylene containing soluble polypropylene dissolved therein is an illustration of a liquid feed which functions particularly well in the apparatus of the invention and is discussed below as a specific application of the invention.

Soluble polypropylene was obtained by flashing the propylene from the propylene column kettle product of a polypropylene plant. Solutions of this polymer in propylene were made up containing approximately 15 to 20 weight percent of polymer. The mixtures were slowly heated to hasten dissolution of the polymer and in all cases, the polymer was completely dissolved by the time that the temperature reached approximately 110° F. Heating and stirring were continued until the desired temperature was reached. Initial separation of a second phase was noted at about 120° F. in all of the runs but the heating was continued until temperatures reached the range of 144 to 175° F. When the desired temperature was reached, the stirring was stopped and the two liquid phases were allowed to settle. The phases were then sampled into tared stainless steel sample bombs. Analysis was performed by slowly flashing the propylene from the sample bombs, then stripping the residual propylene from the polymer by passing a small stream of nitrogen thru the bomb. The propylene-free polymer was weighed in the bomb and the weight percent of polymer in the phase sample was computed. The data are presented in the table below.

TABLE.—COMPOSITION OF COEXISTING PHASES IN SYSTEM: PROPYLENE-SOLUBLE POLYMER

| Run No. | Sampling temp., F.[1] | Original charge composition, wt. percent polymer [2] | Polymer-rich phase | | Propylene-rich phase | |
| --- | --- | --- | --- | --- | --- | --- |
| | | | Volume, ml.[3] | Composition, wt. percent polymer [4] | Volume, ml.[3] | Composition, wt. percent polymer [4] |
| 1 | 144 | 15.8 | 8 | 43.9 | 64 | 9.91 |
| 2 | 145 | 19.5 | 12 | 41.4 | 60 | 13.95 |
| 3 | 150 | 19.5 | 15 | 45.7 | 71 | 8.65 |
| 4 | 164 | 16.3 | 10 | 53.5 | 72 | 7.73 |
| 5 | 175 | 19.5 | 14 | 53.3 | 71 | 8.07 |

[1] Upper cloud point temperatures were 125° F. for runs 2, 3, and 5, and 120° F. for runs 1 and 4.
[2] Samples contained acetylacetone, metal chelates, and other components in addition to the soluble polymer, introduced in the plant propylene polymerization process.
[3] Volumes measured at the sampling temperature.
[4] This percentage includes the acetylacetone, metal chelates and other less volatile components as well as the polymer.

The foregoing data demonstrate the feasibility and advantages of separation of the bottoms effluent or kettle product of the distillation column by phase separation into a heavier and a lighter fraction so as to exclude most of the soluble polymer from the reboil liquid and thereby not only substantially eliminate polymer deposition in the reboiler tubes but also increase the efficiency of the olefin recovery. The recovery of olefin is economically significant in that this recovered monomer is recycled to the polymerization process in the plant and contributes materially to the economical production of polymer and the reduction in polymer cost. In normal operation, at the present time, the bottoms product from the stripping vessel is discarded and any monomer contained in this discarded product is lost.

The invention is applicable to the recovery of volatile hydrocarbons, such as monomers, found in the wash liquid from copolymerization processes as well as from processes producing homopolymers such as the production of polypropylene from the single monomer. Ethylene and propylene, ethylene and butenes, propylene and butenes, etc. are conventionally copolymerized and the solid polymer is washed with one or both of the monomers, or with a diluent, to remove soluble polymer therefrom and these wash liquids are amenable to separation and recovery in accordance with the invention.

In operating in accordance with the invention with various olefin monomers and soluble polymers, the conditions of operation will be determined by the specific materials involved and the concentration of the soluble polymer in the monomer(s). In any case, the solution containing the monomer and the polymer must be heated to a temperature above the upper cloud point of the solution in order to effect adequate phase separation. Heating to a temperature substantially above the upper cloud point, such as 10 to 20° or more thereabove, facilitates the concentration of the soluble polymer in the heavier fraction. In normal operation of the distillation column, the temperature of the kettle product is usually above the upper cloud point of the solution and the phase separation is readily made by settling or centrifuging at the existing kettle product temperature. However, if the distillation column is operated under conditions which impart a kettle product temperature below the upper cloud point of the solution, a heat exchange may be provided in line 14 for raising the temperature of this stream to the desired level.

In effecting the separation of propylene from a solution containing soluble propylene polymer recovered as wash liquid from a polypropylene plant, the concentration of soluble polymer in the kettle product stream (line 14) is usually in the range of about 8 to 25 weight percent of the stream and the phase separation increases the polymer concentration in the heavier fraction to the range of about 35 to 60 weight percent thereof. This concentration of polymer in the heavier fraction provides a substantially higher concentration of monomer in the lighter fraction with the accruing advantages set forth in the above operation of the process. In order to effect good phase separation of propylene from soluble polymer with concentrations in the range of 8–25 weight percent of the soluble polymer, the solution is usually heated to a temperature in the range of about 135 to 180° F. When operating with other monomers and soluble polymers, temperatures at least 10–20° above the upper cloud point are used and these temperatures are readily determined by simply determining the upper cloud point in the manner illustrated herein in reference to propylene and soluble polymer thereof.

Certain modifications of the invention will become apparent to those skilled in the art and the illustrative details disclosed are not to be construed as imposing unnecessary limitations on the invention.

I claim:

1. In a process for recovering wash liquid substantially free of polymer from washings obtained by washing a solid olefin polymer in admixture with soluble polymer of the same olefin and monomer of said olefin comprising the steps of:
   (a) feeding said washings into a fractional distillation column and there distilling same so as to recover an overhead vapor stream of said monomer and lighter vapor fractions in minor amount, a bottoms liquid stream of said monomer and said soluble polymer in substantially higher concentration than in said washings in the range of 8 to 25 weight percent of said liquid stream, and an overhead side stream of said monomer substantially free of said light fractions as the recovered wash liquid;
   (b) passing a substantial portion of the bottoms stream of step (a) in liquid form thru indirect heat exchange tubes of a reboiler to heat said stream and returning the heated liquid stream to the bottom section of said column as reboil liquid wherein there is a tendency for polymer to deposit in said tubes; the improvement comprising:
   (c) passing the bottoms stream of step (a) at a temperature of at least 10° F. above the upper cloud point thereof to a phase separation zone so as to effect a phase separation into a polymer-rich phase and a monomer-rich phase; and
   (d) utilizing the monomer-rich phase of step (c) as the reboil liquid of step (b).

2. The process of claim 1 wherein said washings are obtained from solid polypropylene in admixture with polypropylene soluble in propylene monomer.

3. The process of claim 2 wherein the temperature of the bottoms stream of step (c) is in the range of 144 and 175° F.

4. The process of claim 1 wherein phase separation is effected in a settling zone.

5. The process of claim 1 wherein phase separation is effected in a centrifuging zone.

6. A process for recovering olefin monomer substantially free of polymer from wash liquid obtained from washing a mixture of solid polymer and soluble polymer of the said olefin which comprises the steps of:
   (a) feeding said washings into a fractional distillation column and there distilling same so as to recover an overhead vapor stream of said monomer and a bottoms liquid stream of said monomer and soluble polymer in substantially higher concentration than in said washings in the range of 8 to 25 weight percent of said liquid stream;
   (b) passing the bottoms stream of step (a) at a temperature of at least 10° F. above the upper cloud point thereof to a phase separation zone and there recovering a lighter fraction richer in monomer than said bottoms stream and a heavier fraction richer in soluble polymer than said bottoms stream;
   (c) passing the lighter stream of step (b) thru an indirect heat exchanger to heat same substantially; and
   (d) passing the heated stream from step (c) into the bottom section of the column of step (a) as reboil liquid.

7. The process of claim 6 wherein said monomer is propylene, the concentration of soluble polypropylene in the bottoms stream of steps (a) and (b) is in the range of 8 to 25 weight percent thereof, the temperature in step (b) is in the range of about 135 to 180° F., and the concentration of polymer in the polymer-rich phase is increased to the range of about 35 to 60 weight percent thereby substantially decreasing the polymer concentration in the reboil liquid.

8. The process of claim 6 including the steps of:
   (e) passing the heavier fraction of (b) to a stripping zone and there stripping monomer from said fraction by contacting same with a hot gaseous stream of said monomer to recover an overhead stream of said monomer; and
   (f) passing the overhead stream of (e) into the bottom of column of (a).

9. A process for recovering a hydrocarbon solvent from a solution of soluble olefin polymer therein which solution has an upper cloud point, comprising the steps of:
   (a) feeding said solution into a fractional distillation column and there distilling same so as to recover an overhead vapor stream of said solvent and a bottoms liquid stream of said solvent richer in said soluble polymer than said solution in a concentration in the range of 8 to 25 weight percent of said stream;

(b) passing the bottoms stream of step (a) at a temperature of at least 10° F. above the upper cloud point thereof to a phase separation zone and there recovering a lighter fraction richer in solvent than said bottoms stream and a heavier fraction richer in soluble polymer than said bottoms stream;

(c) passing the lighter stream of step (b) thru an indirect heat exchanger to heat same substantially; and (d) passing the heated stream from step (c) into the bottom section of the column of step (a) as reboil liquid.

References Cited

UNITED STATES PATENTS

| | | | |
|---|---|---|---|
| 2,277,070 | 3/1942 | Carney | 202—160 X |
| 2,452,414 | 10/1948 | Wong | 203—98 X |
| 2,472,499 | 6/1949 | Stone | 203—26 X |
| 2,577,701 | 12/1951 | Deming et al. | 203—27 X |
| 2,619,814 | 12/1952 | Kniel | 203—6 X |
| 2,084,149 | 4/1963 | Stevens et al. | 260—93.7 X |
| 3,257,372 | 6/1966 | Moon | 260—93.7 |

NORMAN YUDKOFF, *Primary Examiner.*

F. E. DRUMMOND, *Assistant Examiner.*